Nov. 5, 1968  B. G. BRAY ET AL  3,409,082
PROCESS FOR STIMULATING PETROLIFEROUS SUBTERRANEAN
FORMATIONS WITH CONTAINED NUCLEAR EXPLOSIONS
Filed April 20, 1964  7 Sheets-Sheet 1
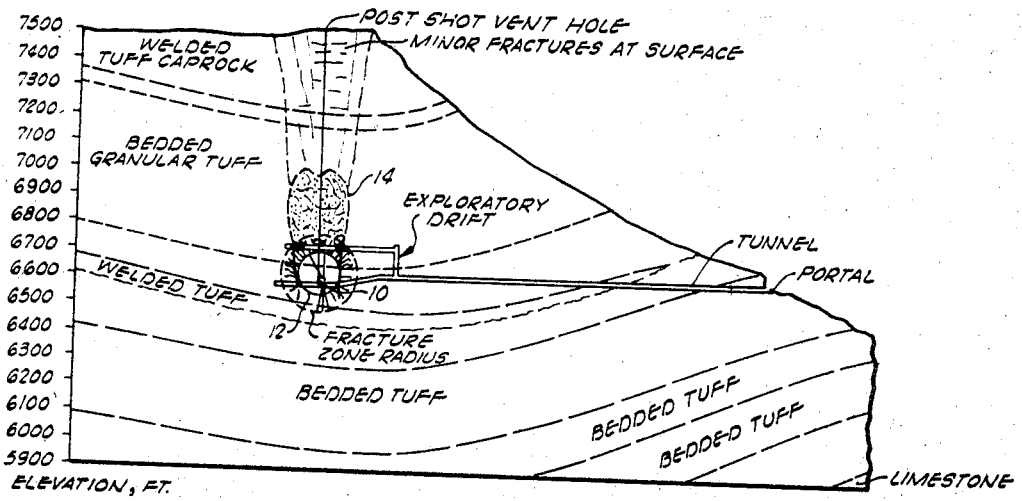
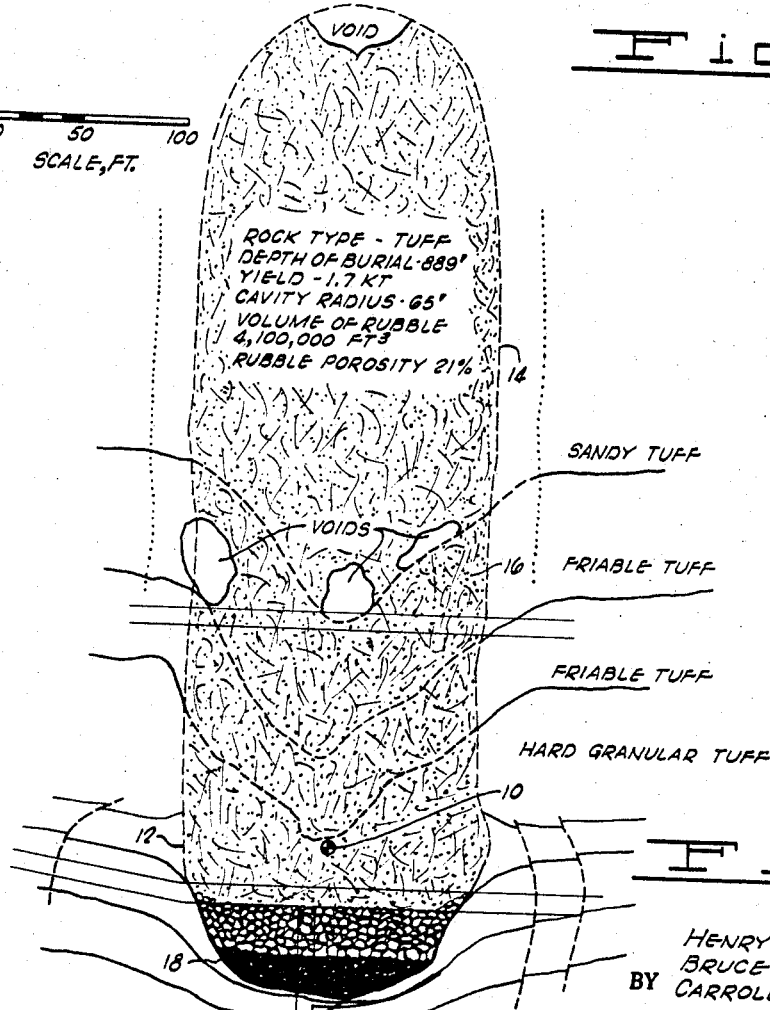
INVENTORS
HENRY F. COFFER,
BRUCE G. BRAY &
BY CARROLL F. KNUTSON
Gerald L. Floyd
ATTORNEY

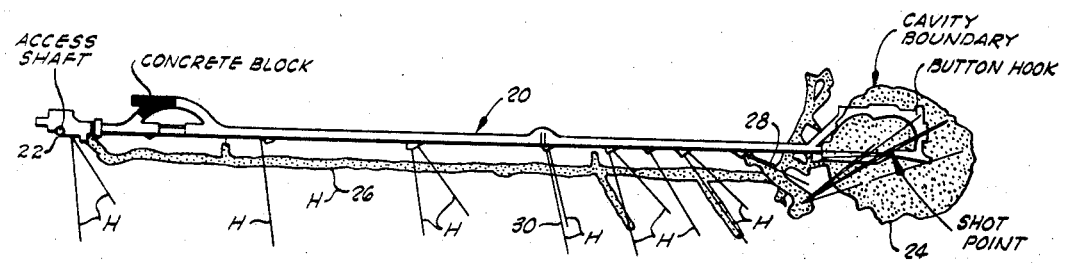
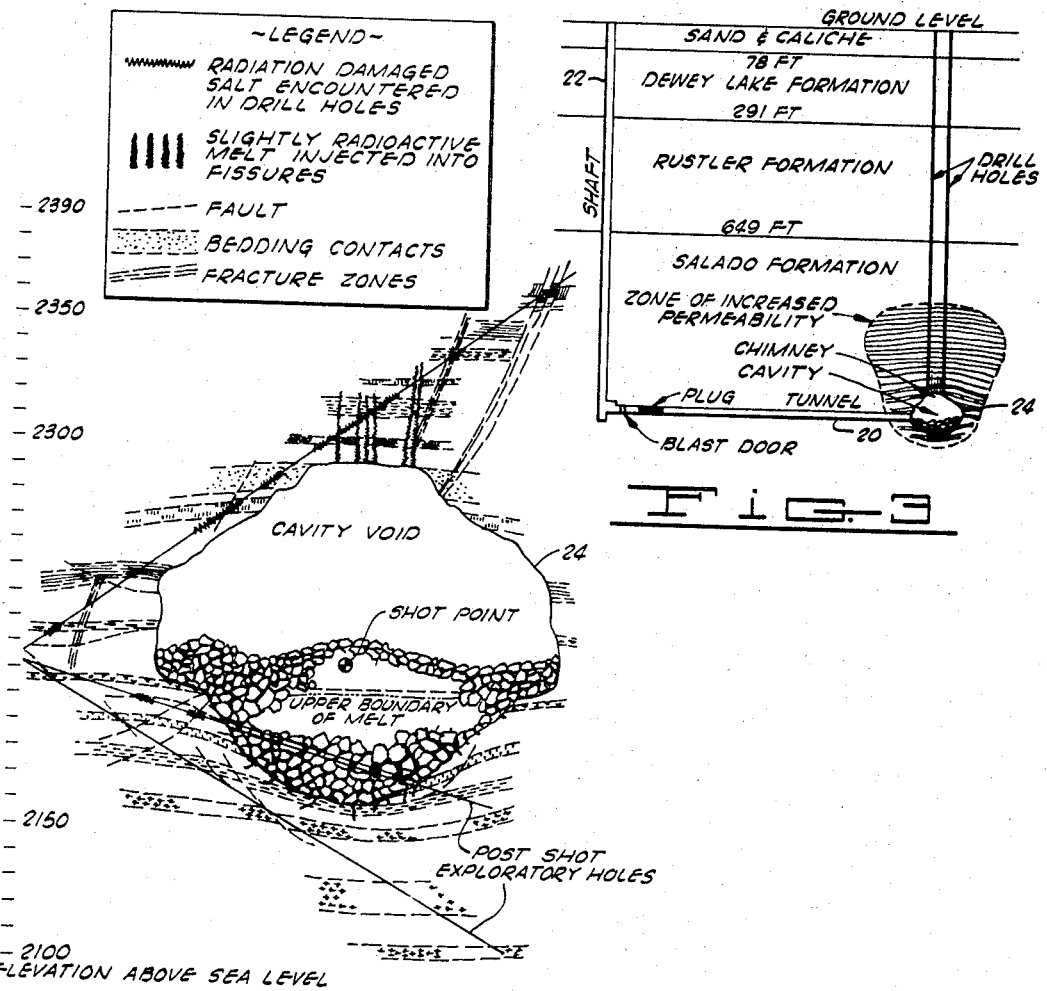

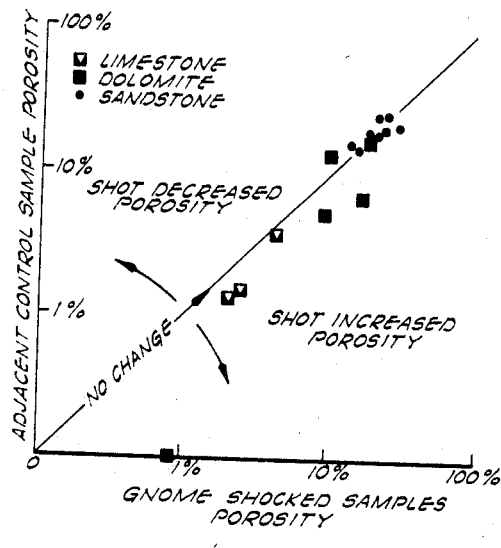

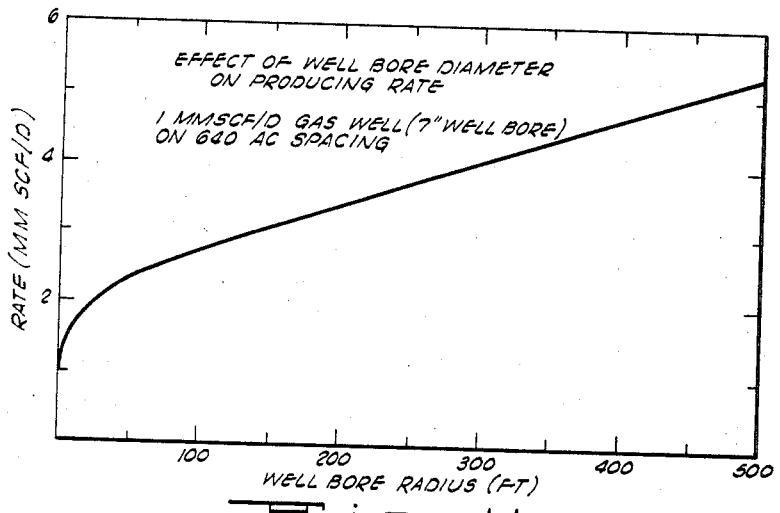
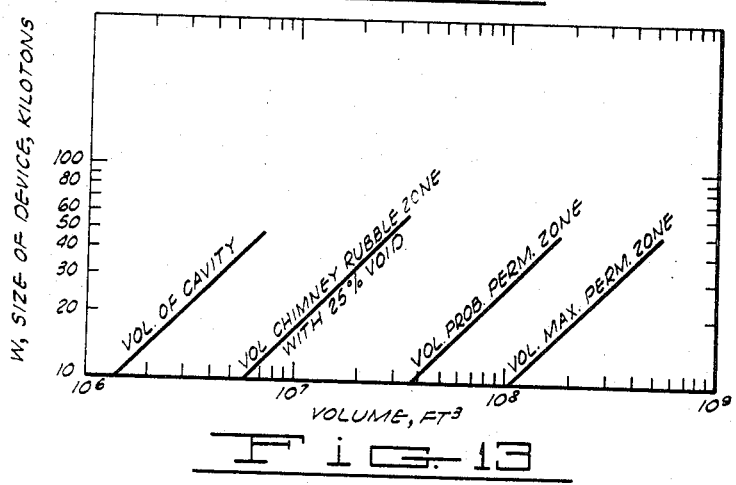
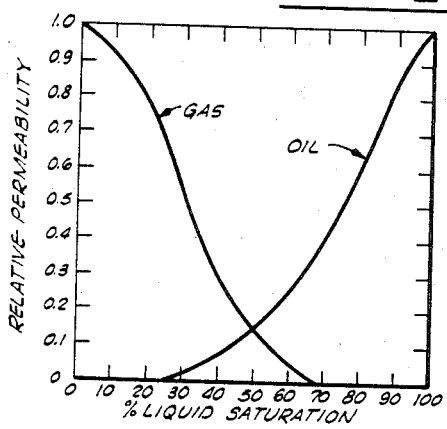

INVENTORS
HENRY F. COFFER,
BRUCE G. BRAY &
BY CARROLL F. KNUTSON

Gerald L. Floyd
ATTORNEY

INVENTORS
HENRY F. COFFER,
BRUCE G. BRAY &
BY CARROLL F. KNUTSON

Gerald L. Floyd
ATTORNEY

INVENTORS
HENRY F. COFFER,
BRUCE G. BRAY &
CARROLL F. KNUTSON
BY
ATTORNEY

United States Patent Office 3,409,082
Patented Nov. 5, 1968

3,409,082
PROCESS FOR STIMULATING PETROLIFEROUS SUBTERRANEAN FORMATIONS WITH CONTAINED NUCLEAR EXPLOSIONS
Bruce G. Bray, Carroll F. Knutson and Henry F. Coffer, Ponca City, Okla., assignors to Continental Oil Company, Ponca City, Okla., a corporation of Delaware
Filed Apr. 20, 1964, Ser. No. 361,051
5 Claims. (Cl. 166—36)

This invention relates to the stimulation of hydrocarbon-containing formations to render economic the recovery of hydrocarbons therefrom. More particularly, the invention relates to the utilization of the energy developed by a contained nuclear explosion to render hydrocarbons contained in subterranean formations more susceptible to recovery.

Large subterranean deposits of oil and gas which cannot be economically produced by conventional methods are now known to exist in this country and in many other places throughout the world. Other deposits may be classed as marginal from the standpoint of the economics of recovering the hydrocarbons therefrom. Still others, using present production methods, will soon be depleted to the point of uneconomic production, even though, at that time, large quantities of oil and gas will still remain in place in the formation. Large oil shale deposits exist in Colorado which contain oil in a quantity approximately equal to the presently known world reserves of this mineral. Also, huge deposits of tar sand exist in Canada which exceed the presently known total world reserves. No procedure has previously been available for economically recovering the oil from either of these deposits.

In addition to oil shale and tar sand sources of petroleum, there exist, as indicated, many formations which contain large amounts of oil and/or gas, but which are of such low permeability that the cost of production is not justified. In many instances, these "tight" formations have been economically produced for a period of time, and have become uneconoimc primarily as a result of decrease in the natural formation pressure over extended periods of production.

Since the advent of the availability of atomic energy, it has become recognized that the tremendous energy which is substantially instantaneously released by a nuclear device can be used in a variety of useful ways which have been generally and collectively described as geographic engineering. In geograhpic engineering, large amounts of earth are displaced, relocated, reshaped, or otherwise physically altered in ways which enable man to better utilize and control his natural environment. The personnel associated with Project Plowshare, a program directed to the development of peaceful uses of nuclear energy, have made great strides in the accumulation of knowledge concerning the effects of exploding nuclear devices beneath the surface of the earth, and have theorized as to various ways in which such subterranean nuclear explosions may be made useful and productive to man.

Based on observations made, and data collected, at the detonation of the Rainier nuclear device in Nevada in late 1957, in the ensuing two years, Plowshare personnel suggested that the subterranean release of nuclear energy might provide a technically feasible and economic method of recovering the oil locked in the Colorado oil shale formation, and for recovery of the very viscous crude oil of the Athabaska Tar Sands in Canada. In both instances, it was contemplated that the portion of the explosion energy which was released in the form of heat would play a major role in the recovery of oil from the impermeable shale and from the tar sands. It was also speculatively suggested by A.T. Biehl and R. R. Henley in a paper appearing at pages 36 through 41 of ULCR 5253, Industrial Uses of Nuclear Explosives, that a nuclear detonation might possibly be used for increasing the yield of oil wells. However, the discussion of this possibility was highly hypothetical and the authors admitted that, in their view, contamination of the environment and the oil by radioactive fission products constituted a major source of concern relative to the feasibility of their proposal.

In 1958, immediately after the Rainier event and the release of the early data obtained therefrom by the United States Atomic Energy Commission and the University of California Radiation Laboratories, we commenced an investigation of the possibility of using the energy from an underground nuclear explosion for economically releasing hydrocarbons from "tight," relatively impermeable formations which could not be economically produced by other known methods. This investigation, stemming from our prior conception of this possibility, included a study of the published data on the Rainier event, particularly that regarding the environment created by the nuclear explosion, and the fact that, at various depths, the explosions had been completely contained so that no undesirable blast or direct radiation effects were experienced at the surface of the earth. The Rainier event data further indicated that the shock waves from the blast, and the pressure energy developed therefrom, crushed and fractured a large amount of rock in the vicinity of the blast, and that the heat energy from the blast persisted in the zone of crushed and fractured rock for some time following the blast. Moreover, substantially all of the fission radioactivity produced by the blast was entrapped in, and completely contained by, the fused rock near the center of the blast.

Based on this information, we reiterated our previously made proposal that a subterranean nuclear explosion be used for increasing the radius of a well bore traversing a tight hydrocarbon-containing formation, and for increasing the permeability of a large zone surrounding a point in the well bore where the nuclear device creating the explosion was detonated. Although we felt that the Rainier event demonstrated the ultimate technical feasibility of our proposal, additional research and investigations was immediately undertaken by us to confirm such technical feasibility, and to evaluate the economic feasibility of the proposal.

As a result of these investigations extending over some five years, and hereinafter described in detail, it now is our conclusion that the energy released by a subterranean nuclear explosion of either the fission or fusion type can be practically used to stimulate hydrocarbon production from porous formations which contain substantial amounts of oil and/or gas. The invention differs from the proposals advanced for freeing the oil from oil shale formations or from tar sands in that its primary applicability is in a subterranean environment in which normal oil- or gas-containing strata exist, which strata cannot be produced economically primarily because of the tightness or lack of sufficient permeability in the formation. Reliance for success in the practice of the invention is placed primarily on the fracturing or crushing effect of the shock and pressure energy developed by the blast as opposed to primary reliance upon the thermal energy developed.

Our invention also differs from the use of nuclear devices disclosed in Hemminger U.S. Patent 3,113,620. It is here proposed to directly and initially employ the nuclear device to fracture and pulverize the formation surrounding a generally conventional well bore without the necessity for initial cavity formation using conventional chemical explosives as taught by the Hemminger patent. It is also intended by the use of the present invention to eliminate the necessity of practicing in-situ combustion in combination with the employment of the nuclear explosion as is prescribed by Hemminger. At the time of filing of the Hemminger patent, it was apparently supposed that the shock wave energy is of such a magnitude that a damping effect is required to prevent undesirable or dangerous motion of the earth's surface above the point of detonation. It was therefore thought necessary to form a large girdle or sphere of ash around the nuclear device prior to detonation. This the patentee proposes to accomplish by gradual enlargement of a cavity using conventional explosives of successively increasing size with one or more intermediate ignitions of the carbonaceous material in the formation to form the thick lining of ash in the cavity prior to detonation of the nuclear device.

Since we have now determined that such pre-forming of an ash lined cavity is not required to effectively and usefully increase hydrocarbon production through the use of nuclear explosives, it will be appreciated that the economics of using nuclear energy becomes much more attractive. Moreover, the technical difficulties of device emplacement are greatly reduced by the present invention.

Broadly, the present invention comprises placing a nuclear explosion in, near to, or somewhat below a subterranean hydrocarbon-bearing formation which it is desired to stimulate so as to facilitate the ease with which the hydrocarbons can be recovered therefrom. Placement of the nuclear device can be accomplished by completing a conventional cased or open bore hole which traverses or extends into proximity to the hydrocarbon-bearing formation and is of sufficient diameter to permit passage of the nuclear device to the preselected detonation location. In general, a hole of about 11 to 30 inches diameter is adequate. It is preferable that the hole be as small as is technically feasible to keep drilling expenses at a minimum. The depth at which the device is positioned and its size (or yield) are based on a number of parameters and conditions, such as depth of the formation from the surface, formation thickness, the presence or absence of water-bearing formations in the lithologic column, the geologic and hydrologic conditions in the shot zone, and the desired post-shot hydrocarbon production. The significance of, and empirical relations between, these parameters and conditions have been investigated, and formulations have been established based upon our own investigations and additional Project Plowshare studies. These relations and formulations are hereinafter described in detail.

In general, it is preferred to position the nuclear device near the base of the petroliferous formation, and to select a device of sufficiently low yield that the explosion will not break through the surface of the earth, and preferably will not result in the radiological contamination of any water-bearing strata above or below the point of the explosion. After placement of the device, it is detonated by methods well-known in the art. The explosion creates a large cavity surrounded by and/or filled with, a zone of crushed or fractured rock having a high porosity and a very high or infinite permeability. Portions of the cavity may collapse, further increasing porosity and permeability, particularly above the point of detonation. The cavity thus created functions both as a hydrocarbon storage volume, or as an increased diameter well bore into and from which the matrix hydrocarbon is produced.

In addition to the creation of the cavity and the immediately surrounding zone of crushed rock, a large thick shell of shock-altered formation rock is formed concentrically around the initial cavity produced by the explosion. The shock-altered rock has inter-and intra-granular micro fractures, low compressive strength, crystal alteration and bonding agent alteration. Such alteration also have a beneficial result toward subsequent flow of fluids and increased production. A large, essentially cylindrical gross fractured zone created by a weakness in formation bedding planes and parting and abrasion by uplift and fall-back is formed due to the explosion. The shock, pressure and rarefaction pressure waves from the explosion resulting in alternating uplift, compressional and tensional forces stressing the formation bedding planes result in radial, circumferential, vertical and horizontal fractures extending into and through a large volume surrounding and above the detonation location. This complex fracture system also results in a substantial increase in the permeability of the hydrocarbon-bearing matrix.

As a result of the described physical changes wrought by the nuclear blast, the hydrocarbon deliverability of the formation is greatly increased. Moreover, there is simultaneously created a large subterranean cavity which can function as a storage facility for storing or retaining large volumes of gas over extended periods of time if such storage is desirable or necessary. Because of the greater accuracy with which results can be predicted, and the reduced possibility of radioactive contamination of the product, the method of the invention is preferably applied to gas-bearing formations, although the process can be used to stimulate oil production from tight formations, or to increase the deliverability from reservoirs containing both oil and gas.

In a preferred embodiment of the invention, a plurality of nuclear devices are detonated substantially simultaneously in or near the bottom of the producing formation. Our investigations have indicated that the size of the cavity and fractured zone created by a nuclear blast does not increase in direct proportion to the yield (or size) of the nuclear device employed, but rather the net gain in cavity size (or effective increase in well bore diameter) is small relative to the increase in the size of the nuclear device used. When a plurality of relatively small devices are used concurrently, however, a much larger cavity and fractured zone is obtained for any given total yield of explosive.

From the foregoing description, it will have become apparent that it is an object of the present invention to provide a novel, technically and economically feasible method for recovering hydrocarbons from subterranean formations.

A more specific object of the invention is to use the energy developed by a nuclear explosion in a safe and effective manner for increasing the productivity of petroliferous subterranean formations.

Another object of the present invention is to increase the permeability and deliverability of a tight hydrocarbon-bearing subterranean formation which cannot now be produced economically by conventional existing techniques.

An additional object of the invention is to provide a new and relatively economic method of forming a large subterranean storage cavity suitable for storing oil and gas in the earth.

A further object of the invention is to provide a rapid and effective way to enlarge the diameter of a well bore traversing a petroliferous formation using nuclear energy to effect such enlargement.

Yet another object of the invention is to use a relatively small, compact source of nuclear energy to fracture and crush a subterranean hydrocarbon reservoir so as to facilitate the flow of the hydrocarbons to a production well where they can subsequently be produced to the surface of the earth.

In addition to the foregoing described objects and advantages of the invention, additional objects and advantages will become apparent as the following detailed description is read in conjunction with the accompanying drawings which illustrate certain aspects of the invention.

In the drawings:

FIGURE 1 is a vertical cross-sectional view through the earth showing the environment of the Rainier nuclear explosion.

FIGURE 2 is an enlarged vertical cross-sectional view through the center of the cavity and chimney formed by the Rainier explosion.

FIGURE 3 is a vertical cross-sectional view through the earth showing the environment of the Gnome nuclear explosion.

FIGURE 4 is a horizontal cross section through the earth and taken through the cavity formed by the Gnome nuclear explosion.

FIGURE 5 is an enlarged vertical cross-sectional view through the center of the cavity formed by the Gnome nuclear explosion.

FIGURE 6 is a graph showing the manner in which limestone, dolomite and sandstone rock samples exposed to shock waves from the Gnome explosion were changed in porosity.

FIGURE 7 is a graph showing the manner in which limestone, dolomite and sandstone rock samples exposed to shock waves from the Gnome explosion were changed in permeability.

FIGURE 8 is a graph illustrating the effect of various shock pressures upon the permeabilities of carbonate and sandstone type reservoir rocks exposed to shock waves generated by the Gnome explosion.

FIGURE 1 is a simplified model illustrating the parameters affecting radial flow rate of oil through a porous media to a well bore.

FIGURE 10 is a typical graphical plot of relative permeability versus fluid saturation for a reservoir containing both oil and gas.

FIGURE 11 is a typical plot of gas production rate versus effective well bore radius for a gas well drilled on a 640-acre spacing.

FIGURE 13 is a graph showing the variation in the volumes of the cavity, the chimney and the probable and maximum permeable zones created by explosions of nuclear devices of varying sizes.

Figure 12A:
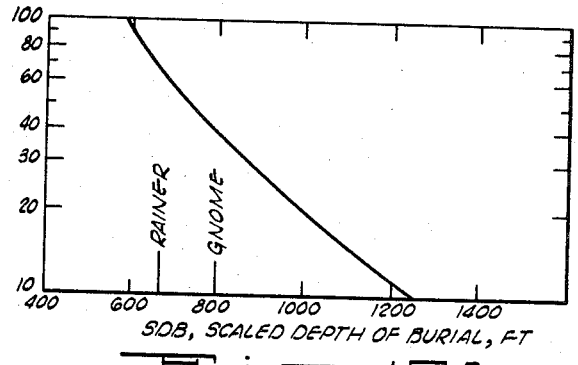
FIGURES 12A, 12B and 12C are graphs showing (1) the variation in scaled depth of burial with device size at a depth of 2700 feet, (2) the variation in cavity radius and permeable zone radius with device size and (3) the variation in chimney height and permeable zone height with device size as extrapolated from Gnome explosion observations.

As hereinbefore indicated, our initial investigations were directed to a study of the observations and data derived from the Rainier event, the explosion of a 1.7-kiloton nuclear device placed at a depth of 899 feet in a Nevada mountain. The portion of the mountain in which the device was detonated was water impermeable volcanic detritus (tuff) underlain by hard dolomite. A cross-section of the Rainier event is portrayed in FIGURE 1.

From the Rainier event and detonations of conventional explosions, scaling laws were developed whereby the effects of exploding various sizes of devices at various depths could be correplated. In general, the depth at which a larger explosion would produce similar effects to a smaller explosion at a shallower depth was determined to increase as the cube root of the size of the explosion. A 1-kiloton explosion has come to be generally accepted as the standard for calculating scaled depth. Thus, a 125 ton device actually exploded at 200 feet depth, and a 27,000-ton device actually exploded at 1200 feet depth have the same scaled depth of burial, i.e., 400 feet for a 1-kiloton explosion. The relationship can be represented by the formula $$SDB = h/W^{1/3} \qquad (1)$$

where $SDB$ = scaled depth of burial
$h$ = depth of burial in feet
$W$ = yield in kilotons It was further observed at the Rainier event that the explosion did not break through the top of the mountain, or stated differently, was completely contained. No detrimental seismic effects were experienced in structures located one-half mile from the explosion. Post-shot exploratory mining and drilling indicated that the blast produced a large, roughly spherical cavity which communicated with a vertically extending, generally cylindrical chimney containing broken and crushed rock. Some departure from spherical symmetry occurred in the cavity due to differential movement of the overburden toward the available free surface.

The scaling law formula empirically worked out for estimating cavity radius as measured in a horizontal plane just below the shot point was $$R_c = CW^{1/3}/(\rho h)^{1/4} \qquad (2)$$

where $R_c$ = cavity radius in feet
$C$ = a constant
$W$ = yield of nuclear device in kilotons
$\rho$ = overburden density in grams per cubic centimeter
$h$ = depth of burial in feet Subsequent contained nuclear explosions in differing rock types have shown that the formula can be used to predict cavity radii within ±20 percent in any type of rock, and within ±8 percent in any single known rock type.

The chimney of broken rock above the shot point was roughly cylindrical in shape with a radius approximately equal to, or slightly larger than, that of the cavity. The top of the chimney was generally dome-shaped as shown in FIGURE 2. The chimney height could be calculated by the formula $$H = 4/3\ LR_c \qquad (3)$$

where $H$ = chimney height in feet (measured from the shot point upward)
$L$ = increase in porosity in the rubble filling the chimney
$R_c$ = cavity radius in feet In the Rainier shot, the cavity produced had a radius of about 65 feet and the chimney height was about 386 feet. The 200,000 tons of rubble formed in the chimney on top of the cavity was permeable to water, had a porosity of 21 percent and occupied slightly more than 4 million cubic feet. Postshot exploratory mining of the Rainier environment indicated that blast-induced fractures extended horizontally 180 feet in one direction from a vertical line passing through the shot point, and 125 feet in the opposite direction from the vertical line. The fractures extended a maximum of about 81 feet below the shot point.

FIGURE 2 is a vertical cross-section through the cavity and chimney formed by the Rainier detonation. The shot point is designated by reference character 10, the cavity by reference character 12, and the chimney by reference character 14. It will be noted that the chimney 14 was filled with crushed and fractured tuff rubble 16. In the bottom of the cavity 12 was a puddle of radioactive glass 18 formed by rock which was melted by the intense heat. Almost all of the fission radioactivity developed by the blast was found to be entrapped in this fused rock, and within about one cavity radius of the cavity, radiation levels were safe for exploratory mining. The glassy fused rock was impermeable to water. Neutron-induced radioactivity did not appear to be widespread. Plowshare scientists tested ground water in areas adjacent to shot location and found very little radiation above the natural background levels.

In order to gain some knowledge as to the micro effects of the blast on the tuff (as opposed to the macro-fracturing and crushing observed and reported by Plowshare personnel), we investigated the permeability and porosity of several tuff samples taken from the crushed zone, and also made comparative permeability and porosity tests on tuff taken from an undisturbed or unaltered zone in the same general region of the Rainier event. The results of these tests are set forth in Table I.

levels of radiation upon crude oil indicated that no major portions of the samples tested were substantially affected by radiation at the levels which it was indicated by the Rainier event could be contemplated in the proposed use of the nuclear devices. Crude oils exposed to $10^8$ roentgens irradiation total dosage (high gamma radiation fluxes) only underwent a very small (less than 5 percent) amount of cracking or polymerization. Small increases in the Conradson carbon and viscosity of the crudes were noted.

The most extensive and valuable investigation of the effects of a subterranean nuclear blast upon various types of typical oil-bearing reservoir rocks, and upon the crude oil itself was made at the time of, and following, the subterranean nuclear explosion known as the Gnome event. This event involved the explosion of a 3.1-kiloton device at a depth of 1184 feet in the bedded Salado salt formation 25 miles southeast of Carlsbad, N. M. The region af-

TABLE I

| Sample No. | Rock Type | Permeability, In Millidarcies | | Porosity Percent |
|---|---|---|---|---|
| | | Horizontal | Vertical | |
| 1 | Crushed Zone Tuff | 8.5 | 6.7 | 28.4 |
| 2 | do | 45.0 | 34.0 | 30.2 |
| 3 | do | 126.0 | 94.0 | 29.1 |
| 4 | do | 65.0 | 84.0 | 27.7 |
| 5 | Fresh Tuff | 6.2 | 3.0 | 40.2 |
| 6 | do | 3.0 | 2.8 | 40.7 |

These data indicate that the permeability of the tuff was generally very substantially increased by the effects of the blast, while the porosity was slightly decreased.

Petrographic examinations were made of both the shocked and unaltered samples upon which permeability and porosity tests were run. The petrographic examinations revealed a marked difference between the crushed and uncrushed tuff. The uncrushed tuff had many small pores in a fine-grained groundmass of glass shards, small mineral grains and bits of rock. This type of groundmass results in a high porosity and low permeability. The crushed zone tuff samples had the "fragile" groundmass compressed and fractured. This resulted in decreased porosity and an increased permeability, except in the case of Sample 1 which had only a small amount of groundmass and very little fracture development. The increased permeability is the result of many small "micro" fractures in the rock.

As a result of the foregoing information derived from the Rainier event, our investigation was intensified and evaluations of various oil- and gas-bearing formations were undertaken with a view to identifying one or more as a location suitable for actual field testing of a nuclear explosion in a producing formation. Concurrently, investigations were commenced relative to the effect of subjecting various types of crude oil and hydrocarbon samples to exposure to various levels of radiation.

With respect to the type of hydrocarbon-bearing reservoir which, in our estimation, would be best suited for the detonation of a nuclear device in field tests, we considered that several general characteristics should be possessed by such reservoir for optimum testing conditions. These were:

(1) good porosity with high oil or gas saturation,
(2) little or low permeability,
(3) relatively thick petroliferous formation or oil-bearing zone,
(4) sparsely populated area, and
(5) few royalty owners.

Several reservoirs at relatively convenient locations were determined to have these properties, and more detailed analyses of the geologic, hydrologic and political features of these reservoirs were then undertaken. One of these is described in greater detail hereinafter.

The radiation tests to determine the effects of varying fected by the detonation was composed of 89 percent halite (rock salt), 7 percent polyhalite, 1 percent anhydrite and 3 percent silt or clay. A vertical cross-section through the earth showing the lithology, and the emplacement position of the nuclear device is illustrated in FIGURE 3.

The Gnome nuclear device was emplaced at the end of a buttonhook-shaped drift or tunnel 20. This detonation location was 987 feet from an access shaft 22 communicating with the drift 20. A number of pre-shot drill holes were drilled laterally outwardly from the drift 20 at varying distances from the shot point. The pre-shot drill holes, H, are illustrated in FIGURE 4, which is a horizontal section through the Salado formation taken just above the drift 20 and having superimposed thereon a section taken through the cavity 24 formed by the blast, and through a post-shot exploratory tunnel 26 drilled from the access shaft 22 parallel to the drift 20.

In order to obtain information relative to the effects of the blast upon various types of reservoir rock and upon different types of crude oil, we submitted samples of these materials for positioning in drill holes 28 and 30. The reservoir rock cores were grouted into thin-walled metal containers using saltcrete cement with the same acoustical properties as the surrounding salt of the formation. Small oil samples were placed in brass machined containers. The cores and small oil samples were attached to a 1-inch pipe and the assembly placed in the drill hole designated by reference character 28 in FIGURE 4. Some additional saltcrete cement was pumped in through the pipe in an attempt to make contact between the main salt body of the formation and the samples. Larger oil samples were placed in accumulators with working pressures of 1500 p.s.i. These were positioned in the drill hole 30 illustrated in FIGURE 4.

Following the Gnome detonation, the shot environment was explored in considerable detail by vertical and horizontal drill holes, and from mining exploration near the shot point. In the mining operation, the reservoir rock and oil samples were recovered from drill holes 28 and 30. The explosion produced a cavity with a total rock volume of about 1 million cubic feet or the equivalent of a sphere with a radius of 62 feet. The cavity was asymmetric, due partly to departures from spherical symmetry during its initial formation and partly to additional changes in shape caused by implosion of the cavity walls, and by uplift and dropping of the ceiling with some associated collapse. The final cavity as illustrated in FIGURE 5 had an average radius of 57 feet from the lower portion of the cavity (measured from the shot point downwardly to the boundary of the radioactive melt in the lower portion of the cavity), an average radius of 80 feet in the equatorial plane, and an average radius of 75 feet in the upper portion of the cavity (measured from the shot point to the rock-void interface).

minimum values insofar as increases in permeability are concerned.

TABLE II

| Sample | Lithological Type[1] | Formation | Permeability (md.) | | Porosity (percent) | | Compressive strength (kg./cm.²) | | Change in porosity (percent) | Change in permeability | Change in compressive strength (percent) | Maximum pressure (kbar.) |
|---|---|---|---|---|---|---|---|---|---|---|---|---|
| | | | Shot | Adjacent | Shot | Adjacent | Shot | Adjacent | | | | |
| 1 | LS | Amsden | 0.1 | <0.1 | 4.4 | 3.6 | 850 | 813 | +22 | -------- | +5 | 3.8 |
| 2 | SS | Tensleep | 36 | 83 | 13.8 | 15.4 | 527 | 714 | -10 | -57 | -26 | 3.8 |
| 3 | DOL | Embar | 27 | 10 | 18.5 | 16.8 | -------- | -------- | +10 | +170 | -------- | 3.7 |
| 4 | SS | Puente | 13 | 26 | 22.7 | 19.6 | -------- | -------- | +16 | -50 | -------- | 3.7 |
| 5 | LS | Madison | 0.2 | <0.1 | 0.9 | 0.1 | 504 | 550 | +900 | -------- | -8 | 4.8 |
| 6 | SS | Tensleep | 169 | 188 | 18.4 | 18.3 | 275 | 453 | +1 | -10 | -39 | 4.7 |
| 7 | DOL | Embar | 0.2 | 26 | 10.0 | 12.6 | -------- | -------- | -21 | -99 | -------- | 4.7 |
| 8 | SS | Repetto | 61 | 160 | 28.6 | 20.2 | -------- | -------- | +42 | -62 | -------- | 4.7 |
| 9 | LS | Madison | <0.1 | <0.1 | 2.6 | 1.5 | -------- | -------- | +73 | -------- | -------- | 6.6 |
| 10 | SS | Tensleep | 205 | 440 | 18.7 | 19.4 | 166 | 339 | -4 | -53 | -51 | 6.5 |
| 11 | DOL | Embar | 1.0 | 0.2 | 9.5 | 5.0 | 96 | 740 | +90 | +400 | -87 | 6.5 |
| 12 | SS | Repetto | 16 | 150 | 21.0 | 24.4 | 44 | 73 | -14 | -89 | -40 | 6.5 |
| 13 | LS | Madison | <0.1 | <0.1 | 2.1 | 1.3 | -------- | -------- | +62 | -------- | -------- | 8.4 |
| 14 | SS | Tensleep | 25 | 203 | 15.0 | 14.1 | 100 | 670 | +6 | -88 | -85 | 8.4 |
| 15 | DOL | Embar | 15 | 0.6 | 16.8 | 6.5 | -------- | -------- | +158 | +2,400 | -------- | 8.4 |
| 16 | SS | Repetto | 38 | 93 | 22.8 | 24.2 | 19 | 21 | -6 | -59 | -10 | 8.4 |

[1] LS, limestone.  SS, sandstone.  DOL, dolomite.

The amount of rock melted by the explosion, based on core data, was estimated to be about 2400 tons, equivalent to 800 tons of rock melted per kiloton of yield. This melt contained most of the radioactive debris and was intimately mixed with about 13,000 tons of rock salt that was imploded, decrepitated or spalled into the cavity, probably during the first minute following the explosion. An additional amount of rock, estimated at about 15,000 tons collapsed from the upper cavity hemisphere and blanketed the region at the cavity base containing the radioactive melt.

One of the most intersting aspects of the Gnome event, from the standpoint of our investigation relative to use of nuclear devices in oil recovery was the greatly increased permeability of the rock in the zone above the shot point as compared to its pre-shot condition. This zone was defined by the extent of complete circulation loss to brine while drilling post-shot exploratory drill holes from the surface. The zone had a lateral extent of over 150 feet in radius and a maximum height of about 350 feet, and represented a rock volume of about 28 million cubic feet or 645 acre feet. Most of this increased permeability was related to parting along bedding planes that resulted from the uplift and dropping of the strata overlying the explosion. Some indication of this parting along bedding planes can be perceived in referring to FIGURE 5 of the drawings.

A visual examination of the reservoir rock samples removed from drill hole 28 revealed no plastic deformation. In general, the sandstones appeared to be unaffected except for minor increase in friability, whereas the carbonate-type rocks were transversely and diagonally fractured. All of these samples which were located in drill hole 28 had been exposed to shock pressures in excess of 3 kilobars.

A cube with 2.2 centimeter sides was cut from one end of each sample. The porosity, permeability and compressive strength of these plugs were measured after they had been cleaned and oven-dried. These data are presented in Table II and are compared with the results from analyses of similarly prepared plugs cut from adjacent control samples of the reservoir rock. All of the samples were carefully selected so that they contained no visible fractures. It is thus very important to note that the data derived from the analyses of "shot" samples represent In referring to Table II, it will be noted that porosity of the "shot" limestone or carbonate-type rocks increased, while the porosity of the sandstone samples showed no significant change. FIGURE 6 is a log-log plot of the porosity of the shot samples and their corresponding adjacent control samples.

The permeability characteristics of the shot samples are graphically displaced in FIGURES 7 and 8. The trend of the carbonate samples was toward a permeability increase that varied with peak shot pressure. Sandstones, on the other hand, showed a rather uniform decrease in permeability. All of the rock types had a general decrease in compressive strength following the shot.

Thin sections were prepared from the center of undeformed, longitudinal slices of the cores before the cores were emplaced in the drill holes. These thin sections were then later compared under a petrographic microscope with adjacent thin sections cut from the samples after the shot. The sandstones showed no apparent changes. The carbonates were generally micro-fractured and grains larger than ½ mm. were extensively twinned by the shot.

In summary then, the effect of shock waves from the Gnome nuclear explosion on the reservoir rock samples could be correlated with rock-type. As indicated above, limestones and dolomites were extensively fractured and showed large increases in permeability and porosity. Sandstones were reduced in permeability, while their porosity was unchanged. These results indicate that limestone or carbonate rock type reservoirs are probably the most suitable candidates for nuclear stimulation. Other good possibilities are reservoirs which are composed of other rock types which deform by brittle fracturing.

The chemical and physical properties of the oil samples enclosed in drill holes 28 and 30 were determined by post-shot analyses. The data obtained were compared with data derived from similar tests upon the original, non-exposed samples. In general, both cracking and polymerization were evident in the samples from both of the drill holes. The relative amounts of each, however, and the overall net effect appeared to be predominantly a function of the type of crude. The shock exposed crude samples in drill hole 28 in general showed more change than the predominantly radiation exposed samples in drill hole 30. The latter samples were exposed to radiation of $7 \times 10^5$ roentgens. The most significant results obtained from testing the crude oil samples was that less than 5 percent of the total amount of crude oil exposed to the blast effects was changed in any way. From this it was concluded that only relatively small fractions of the total reservoir crude in the vicinity of a nuclear explosion would be affected by shock or radioactivity. There was no residual radioactivity detected in any of the oil samples.

Using Equation 2 hereinbefore set forth for predicting the cavity radius as a function of depth of burial, the size of the zone of gross increased permeability produced by the Gnome explosion may be scaled to larger yield explosions in reservoir rock in the following manner. The constant C in the cavity radius equation varies with the type of rock in which the device is detonated, and has been found to equal 281 for salt and 342 for volcanic tuff (as in the Rainier event) containing 20 to 25 percent water. A constant of 350 is believed to be a reasonable approximation for an oil reservoir environment where significant quantities of oil, water and calcium carbonate decompose or vaporize to produce gases. An average bulk density may be assumed to be 2.34, and the cavity radius, $R_c$, is calculated for two scale depth of burial conditions, i.e., scale depths of burial (SDB) of 800 feet and 450 feet. The scale depth of burial, SDB, is calculated by the formula $$SDB = h/W^{1/3}$$

where $h$ is the true depth of burial and $W$ is the yield in kilotons. Table III shows the variation in cavity radius size as a function of yield at the two scaled depth of burial conditions. Also shown is the estimated volume of rock in acre feet in which there is expected to be a large increase in permeability. This extrapolation from the Gnome data assumes that this zone increases with yield proportional to the increase in cavity radius, $R_c$, and assumes that the permeable zone can be approximated by a cylinder.

TABLE III

| Yield in kilotons at scaled depth of burial of 800 and 450 ft. | Cavity radius (ft.) | Depth of burial $h_D$ (ft.) | Volume of gross permeability increase (acre ft.) | Height of the permeable zone, $h_p$ (ft.) |
|---|---|---|---|---|
| 10 kt., SDB 800 | 96 | 1,720 | 2.1×10³ | 540 |
| 10 kt., SDB 450 | 110 | 970 | 3.2×10³ | 620 |
| 100 kt., SDB 800 | 167 | 3,720 | 1.1×10⁴ | 940 |
| 100 kt., SDB 450 | 196 | 2,100 | 1.8×10⁴ | 1,110 |
| 500 kt., SDB 800 | 252 | 6,350 | 3.8×10⁴ | 1,420 |
| 500 kt., SDB 450 | 290 | 3,600 | 5.9×10⁴ | 1,640 |
| 1,000 kt., SDB 800 | 299 | 8,000 | 6.4×10⁴ | 1,690 |
| 1,000 kt., SDB 450 | 346 | 4,500 | 1.0×10⁵ | 1,950 |

It should be emphasized here that the data presented in Table III should be taken as order of magnitude approximations only to show how these parameters are expected to vary, and are not quantitative predictions.

From Table III it appears that nuclear devices in the yield range of approximately 100 kilotons would be the most useful for oil reservoir conditions with a production zone thickness of about 1,000 feet at depths of 2,000 to 4,000 feet (the U.S. average). It should further be pointed out that based on the Rainier, Gnome, other subterranean nuclear explosions, and tests of conventional chemical explosives, the scaled depth of burial should almost always exceed 400 to avoid breakthrough at the surface.

As a result of the reservoir rock and oil sample analyses of the samples exposed to shock and radiation in the Gnome event, our conclusion was reaffirmed that the shock energy from the nuclear device could be used to upgrade or beneficially change the properties of reservoir rock without substantially affecting the chemical nature of the oil in place in a producing formation. Examination of the salt surrounding the shot point showed the cavity with the associated chimney and fracture zone to be typical of those observed in previously conducted contained nuclear explosions.

It will now be understood from the foregoing discussion that the formation of the zone of broken and fractured rock around a well bore by the detonation of a nuclear device therein will beneficially alter the flow pattern of the original hydrocarbons toward the well bore. After the detonation of the nuclear device, there is established a flow regime in which oil and/or gas from the original tight reservoir rock flows through a mass of highly permeable rock and into the new well bore. This broken rock serves as a supply reservoir from which the hydrocarbon is recovered, the rate of flow being controlled by the low permeability rock of the original reservoir at the boundary of the broken zone. In order to more clearly demonstrate the effect upon oil recovery and deliverability of detonating a nuclear explosive in a well bore, the mathematical formulae used for predicting the geometric features produced by such explosions have been applied by us to the reservoir characteristics of an existing gas-producing reservoir which has been thoroughly investigated as a possible site for the field testing of the present invention. The following discussion will further illustrate to the reader the basis of our conclusion that this method of improving oil and gas recovery is technically feasible.

The scaling formulae which have been worked out based upon a number of contained underground nuclear explosions for calculating the size of the cavity radius and chimney height have been set forth hereinbefore as Equations 2 and 3. Additionally, formulae have been worked out for calculating in advance the radius of the permeable zone formed by the explosion, the height of the permeable zone and, of course, the scaled depth of burial. These formulae are as follows:

Radius of permeable zone—  (4)

$$R_p = C_R R$$

where $R_p$ = radius of the permeable zone in feet
$C_R$ = a constant (ranging from 2.41 to 3.47)
$R$ = cavity radius in feet Height of permeable zone—  (5)

$$H_p = C_H R_p$$

where $H_p$ = height of permeable zone in feet
$C_H$ = a constant (approximately 2.34)
$R_p$ = radius of permeable zone in feet In the above formulae, our knowledge of the small scale or micro effects upon reservoir rocks which was derived from the test of samples subjected to the blast at the Gnome event is quite useful in predicting chimney height (used to obtain L in Equation 3), as well as in providing an insight into the fluid transmission characteristics (permeability) of the rubble and fractured zone matrix.

Before applying the scaling equations to a specific gas-bearing reservoir which we have investigated, it is believed that a brief review of the fluid flow characteristics in porous media will be helpful in understanding the manner in which the environment created by the explosion contributes to, or results in, a substantial increase in the productivity of wells tapping the post-shot cavity-chimney-fracture zone. The petroleum reservoir is an interconnected pore system within the rock. The hydrocarbon flows from this pore system into the well bore by virtue of an energy gradient. The simplest steady state form of gradient equation for fluid flow is:

$$Q = \frac{kA}{\mu} \frac{\partial P}{\partial X} \qquad (7)$$

where $Q$ = flow rate
$k$ = permeability
$A$ = cross-sectional area
$\mu$ = fluid viscosity
$P$ = fluid pressure
$X$ = distance Equation 7 assumes the steady state laminar flow of an incompressible fluid through a homogeneous isotropic media. The well bore can be visualized as draining a radial flow system as schematically depicted in FIGURE 9. Integrating Equation 7 using the boundary conditions of horizontal radial flow of an incompressible fluid yields:

$$Q = \frac{ckh'(P_e - P_w)}{\mu \ln(r_e/r_w)} \quad (8)$$

where $Q$ = flow rate
$c$ = a constant depending on the units used
$k$ = permeability of reservoir rock
$h'$ = thickness of the reservoir
$P_e$ = pressure at the drainage radius
$P_w$ = pressure at the well bore
$\mu$ = fluid viscosity
$r_e$ = radius of the drainage area
$r_w$ = well bore radius It is apparent that the rate of flow, $Q$, is inversely proportional to the log of the radius ratio; hence, flow rate is not very sensitive to moderate changes in this radius ratio.

Integrating the radial flow Equation 7 for compressible fluid flow (gas) yields:

$$Q_s = \frac{c'kh(P_e^2 - P_w^2)}{\mu P_s \ln(r_e/r_w)} \quad (9)$$

where the subscript $s$ indicates the base pressure at which the gas volume is calculated.

When more than one fluid phase is flowing, Equation 7 is still applicable if the relative permeability concept is applied. Simply stated, the rate of one flowing phase can be predicted if the permeability term is scaled down. FIGURE 10 shows a typical relative permeability versus saturation plot. The plot shows that the oil rate can be predicted for this reservoir rock at an average oil saturation of 50 percent if the permeability is scaled down to 15 percent of its original value.

The geometry of the post-shot nuclear environment can be used in the simple steady state radial flow equation by assigning concentric annular configurations to the chimney-cavity and the fractured zone. The equivalent permeability for the complex radial system is:

$$\bar{k} = \frac{\log r_e/r_w}{\sum_{i=1}^{i=n} \frac{\log r_i/r_{(i-1)}}{k_i}} \quad (10)$$

where $\bar{k}$ = equivalent permeability of complex flow system
$r_e$ = radius of well drainage area
$r_w$ = radius of well bore
$r_i$ = radius of the $i$th annular zone
$k_i$ = permeability of the $i$th annular zone Probably one of the simplest ways to illustrate the effect of the post-shot environment on the productivity or producing rate is to assume it acts like an enlarged well bore. FIGURE 11 is a plot of rate versus "well bore radius" for a gas well on a 640-acre spacing. It is apparent from this figure that after a radius of several hundred feet is obtained, only relatively small increases in rate are obtained with further relatively large radius increases.

The foregoing concepts and equations relative to fluid flow in porous media are well-recognized in the art, but are included to give the reader some appreciation of the flow of fluid through porous media as such flow is affected by the increase in well bore resulting from the detonation of a nuclear device. The actual equation used in the analysis of the deliverability of low productivity wells either with or without nuclear stimulation is somewhat more sophisticated. Unsteady state gas flow in a single well, symmetric, radial system of varying radial permeability can be described by the equation:

$$2\phi\mu \left(\frac{\partial P}{\partial t}\right) = \frac{1}{r}\frac{\partial}{\partial r}\left[k_r r \frac{\partial P^2}{\partial r}\right] \quad (11)$$

where $\phi$ = the effective porosity
$\mu$ = the viscosity
$P$ = pressure
$t$ = time
$r$ = radius
$k_r$ = permeability as a function of radius In essence, Equation 11 represents the basic principles of conservation of mass (continuity equation) and of momentum (Darcy's law in the radial case) applied to flow in porous media. It assumes an ideal gas at constant temperature with viscosity independent of pressure and neglects gravitational effects. Because of the non-linear properties of the equation, analytic solutions are only available for certain special cases. However, numerical solutions may be effected by the use of high speed computers employing finite difference techniques. As such then, solution of the equation with appropriate boundary conditions gives a detailed accounting of flow for any drainage geometry from the vicinity of the well bore to the drainage radius of the well. The radial extent of a fracture system created by an explosion in a gas-bearing formation, and the radial permeability distribution of the system can be studied. In addition, as will be hereinafter demonstrated, the flow capacity, including the effect of "well bore storage unloading" of the post-shot fracture system can be compared with pre-shot formation deliverability.

In using the dynamic fluid flow mathematical model (Equation 11) hereinbefore described to evaluate post-shot fluid flow characteristics in a porous media, one of the gas-bearing formations investigated by us for field test feasibility was selected for examination because it is believed that possible radiation contamination of the produced fluid will be minimal in the gas phase. Additionally, a single fluid phase allows more accurate evaluation of the stimulation mechanism upon deliverability. Of course, mathematical models for 2-phase flow are available and similar calculations to those hereinafter appearing can be made for the case of oil reservoir stimulation.

The gas-bearing formation to which the dynamic fluid flow model and scaling laws will be applied in the following example is located in a highly laminated sandstone, siltstone, shale sequence. The individual sandstonte lenses and lamellae are usually less than an inch thick, and frequently terminate in the space of a 3½-inch core. The sands are fine to medium grained, poorly sorted, with a clayey matrix. The salinity of the formation water is approximately 85,000 p.p.m. and the formation is fresh water sensitive due to the clay content. A summary of the properties of this reservoir used in the following nuclear stimulation calculations is set forth in Table IV.

TABLE IV

Reservoir characteristics:
    Top hydrocarbon-bearing formation ___ft__ 2300
    Gross thickness _____ft__ 400
    Net effective pay thickness (37.5%) ___ft__ 150
    Pressure _____p.s.i.a__ 450
    Temperature _____°F__ 95
    Gas specific gravity (air=1.00)_____ .647
    Pressure base _____p.s.i.a__ 15.025

Formation properties:
    Porosity _____percent__ 12.7
    Permeability _____md__ 5.7
    Median permeability _____md__ 1.3
    Residual oil saturation _____percent__ 5
    Residual water saturation _____do__ 37
    Irreducible water saturation _____do__ 37
      (based on median permeability)
    Grain density _____gm./cc__ 2.68
    Bulk density _____gm./cc__ 2.38

Calculated reserves:
  Hydrocarbon pore volume=33.4×10⁷ cubic feet/640 acres
  Initial gas in place=9.96×10⁹ std. cu. ft. gas/640 acres or 9.96 billion standard cubic feet per section In addition to the properties given in Table IV, a number of practical geologic, geographic and political conditions must be satisfied relative to any reservoir in which it is proposed to detonate a nuclear explosive for the purpose of increasing production. Among the more important of these are:

(1) That the hydrology of the area is known;
(2) That the producing formation is located sufficiently below or above any water-bearing zones so that not only is the explosion contained, but no contamination of the water-bearing zones occurs; and
(3) That the formation is located at a rather isolated area.

In order to take maximum advantage of the uplift-rebound effect of the explosion on the lenticular formation, the nuclear device should be located at or somewhat near the base of the formation. For the purpose of the following calculations, a true depth of burial in the example formation was assumed to be just the base of the gas-bearing formation at 2700 feet.

The scaled depth of burial for various device sizes at the assumed true depth burial, $h$, of 2700 feet was calculated from Equation 1. Results of the calculations are given in FIGURE 12A. Scaled depths of burial for previous contained underground explosions in salt (Gnome) and tuff (Rainier) are also shown in this figure. In order to more closely extrapolate from the Gnome post-shot conditions, it will be assumed that a 40-kiloton device is detonated at the 2700-foot level in order to give a scaled depth of burial substantially equivalent to that of the Gnome event (800 feet).

The predicted cavity radius created by an underground explosion was calculated from Equation 2. A constant, $C$, of 290 was selected for the calculations because of the low total water content of the selected formation, and the low probability of gas evolution through matrix decomposition. The calculated cavity radius is plotted in FIGURE 12B. The height of the cylindrical chimney was calculated from Equation 3 and is plotted in FIGURE 12C.

Two permeable zone radii corresponding to the most probable and maximum values observed at the Gnome event can be calculated. At the Gnome event, the permeable zone radius was 150 feet and the cavity radius was 62 feet as hereinbefore indicated. Therefore, the constant, $C_R$, for extrapolation of the "probable" radius of permeability increase is 150/62=2.42; and the probable permeable zone radius is:

$$R_{p\ prob}=2.42R$$

The maximum permeable zone radius from the Gnome event data is based on damaged salt observations at 215 feet and water seep data observed in the exploratory post-shot tunnel at 212 feet from the shot point. Therefore, the constant for the maximum radius of increased permeability is 215/62=3.47; and the maximum permeable zone radius is:

$$R_{p\ max}=3.47R$$

Figure 12B:
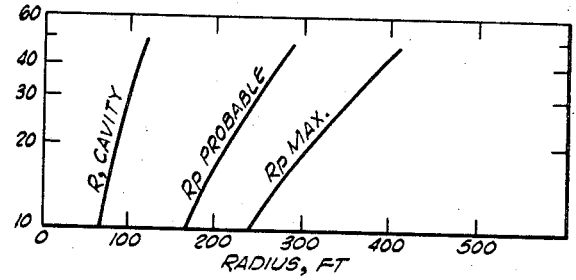

Both $R_p$ probable and $R_p$ maximum are plotted in FIGURE 12B.

Similarly, the height of the permeable zone can be calculated from the Gnome data and from Equation 5, hereinbefore set forth. The extrapolations based on the Gnome data result from the surface drill hole definitions of the zone of increased permeability during post-shot drilling into the cavity, and also from the core holes from the post-shot exploratory tunnel. The zone was observed approximately 350 feet above the shot point. The extrapolation constant, $C_H$, for height of the permeable zone is 350/150=2.34. Therefore, the scaled heights of the permeable zone increase from the Gnome data are:

$$H_{p\ prob}=2.34R_{p\ prob}$$

Figure 12C:
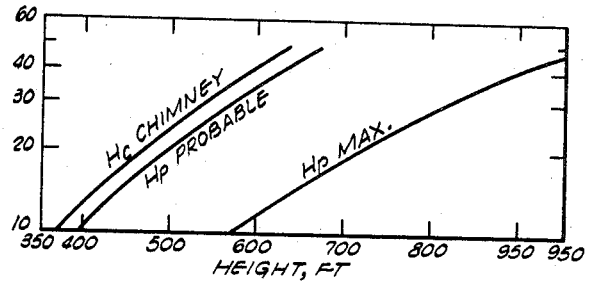

This value is plotted in FIGURE 12C and the maximum height of the permeable zone derived in the same way is also plotted.

Volumes of (1) the spherical cavity, (2) a chimney having a bulk porosity of 25 percent, (3) the probable permeable zone, and (4) the maximum permeable zone, were calculated, and are plotted against the size of the nuclear device in FIGURE 13.

A 40-kiloton underground nuclear explosion at a depth of 2700 feet below the surface in the selected gas-bearing formation will produce the following calculated environment:

(1) A cavity radius of 110 feet.
(2) A probable permeable zone radius of 270 feet.
(3) A maximum permeable zone radius of 385 feet.
(4) A probable permeable zone height of 630 feet.
(5) A maximum permeable zone height of 900 feet.
(6) A cavity and/or chimney void volume of 5.7 million cubic feet.
(7) A probable permeable zone volume of 140 million cubic feet or 3220 acre feet.
(8) A maximum permeable zone volume of 420 million cubic feet or 9650 acre feet.
(9) A total cavity and chimney volume of 23 million cubic feet or 528 acre feet.

A complete description of the finite difference approximations used for the solution of Equation 11 for the transient isothermal flow of gas in porous media is set forth in previously published papers, and therefore need only be briefly summarized here. The solution of the equation involves breaking the total well bore drainage area into a number of annular, concentric cells of specified permeability and calculating the well production-pressure-time history for a large number of time increments. In the case of the application of the equation to the post-shot environment of the foregoing described existing gas reservoir, flow capacity of the existing pre-shot reservoir matrix was determined from a computer fit of well test data from existing wells in the formation. This value for flow capacity was also used in the unaffected area in the explosion stimulated calculations. Permeability (or capacity) in the cavity-chimney area near the well bore in the explosion stimulated cases was arbitrarily assumed to be more than 100 times greater than that of the unaffected formation. This ratio was arbitrarily decreased to unity at the radius of the shot-affected zone. In effect, this variation implies that a large well bore was created, but it allows material balance accounting of the gas present in the blocks of rubble, and in the matrix rock between fractures.

Figure 14:
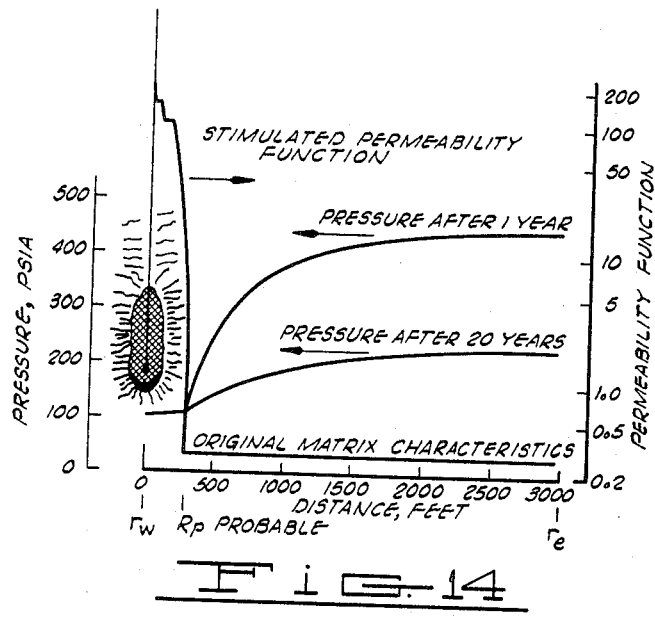
FIGURE 14 is a graph illustrating the manner in which permeability varies with distance from the shot point in a reservoir stimulated by a nuclear explosion.

An example of the permeability function characteristic for an explosion stimulated well is given in FIGURE 14. The production schedule was started by picking an initial production rate consistent with an estimated saleable quantity of gas from a well in the area. It was also specified that after pressure in the well bore reached approximately 100 p.s.i.a., no further reduction should occur. This was a practical specification to provide satisfactory delivery pressure of gas to the gathering system.

The computer model was used to predict the production-pressure-time history for five gas production situations. Two of these situations involved conventional unstimulated production and three involved production stimulated by a nuclear explosion. Specifically, these cases correspond to:

(1) One conventional well per 640-acre section; a 4¾-inch open hole completion through the entire producing formation.
(2) Four conventional wells per 640-acre section; each well draining 160 acres.

(3) One "probable" nuclear stimulated well per section. The fractured, permeable zone radius used in this calculation was 270 feet.

(4) One "minimum" nuclear stimulated well per section. It was assumed in this calculation that no fracturing occurred beyond the initial cavity and chimney formed by the shot, and that the permeable zone radius was 110 feet.

(5) One "possible" (maximum) nuclear stimulated well per section. The fractured permeable zone radius in this calculation was assumed to be 385 feet.

Figure 15:
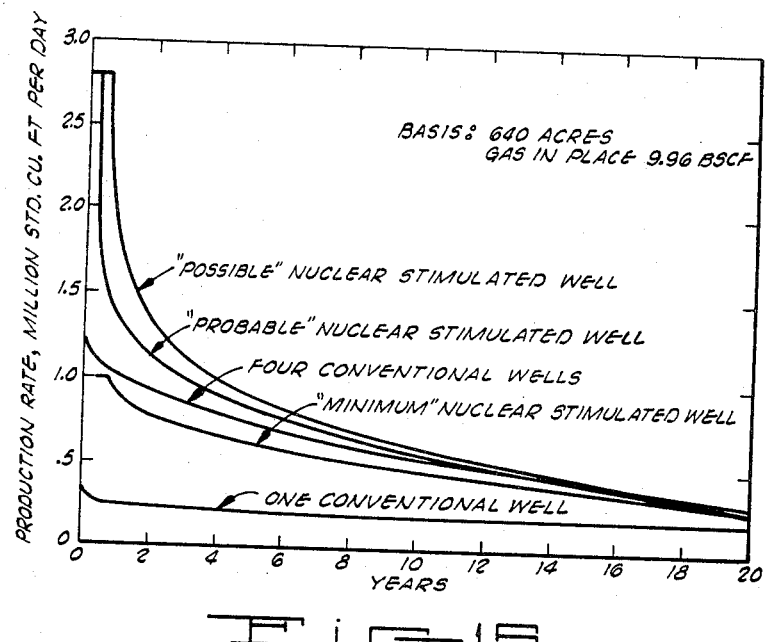
FIGURE 15 is a graph in which gas production rate is plotted against time for five hypothetical production situations, three of which consider the effect of employing nuclear explosions to increase production.

The resultant numercial data for each of the foregoing described cases includes the pressures in each incremental cell for each time period. Two such pressure-radius relationships are shown in FIGURE 14. The gas deliverability for each of the five cases is shown in FIGURE 15. A summary of pertinent production data and events for the five cases is given in Table V.

superpositioned shock wave forces which create an effective dynamic flow pattern of increased advantage to that which is produced when a single device of equivalent or larger yield is employed.

Figure 16:
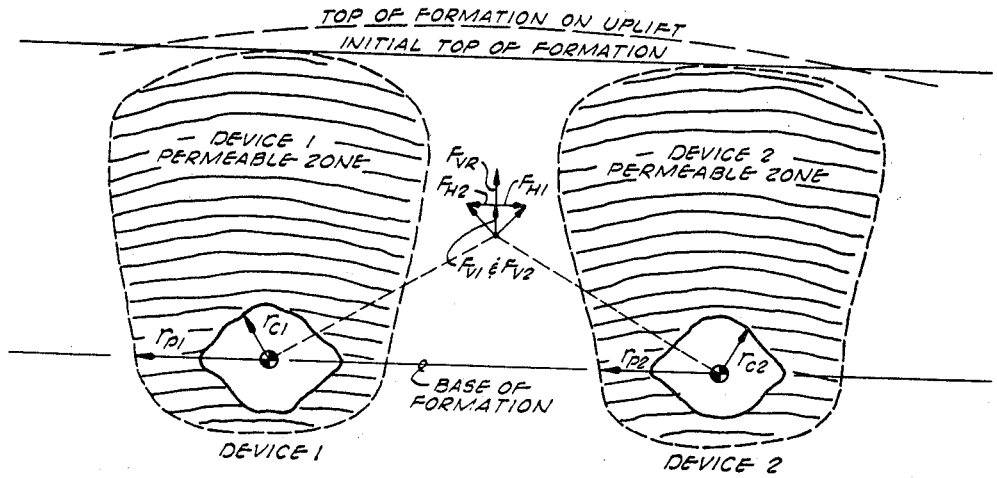
FIGURE 16 is a cross-sectional diagram illustrating the general location of, and horizontal and vertical forces generated by, two relatively small nuclear devices detonated substantially simultaneously for the purpose of increasing oil and/or gas production.

FIGURE 16 illustrates the manner in which it is contemplated to position a plurality of nuclear devices at, or somewhat below, the base of the hydrocarbon-bearing formation so that the combined uplift forces of the shock energies from the multiple detonations result in an enlarged zone of increased permeability. A review of the scaling laws for single explosions hereinbefore described show that all of the scaling factors are dependent upon the explosive size of the device to the one-third power. It has also been shown that the flow characteristics in a producing well in a reservoir system vary logarithmically with the effective well bore radius. Therefore, the placement of two or more horizontally spaced smaller devices in the formation will create an effective permeable zone

TABLE V

|  | Initial Rate, M.s.c.f.p.d. | Time On Initial Rate, Days | Pressure at the Drainage Radius After 20 Years, P.s.i.a. | Prod. Rate at End of 20 Years, M.s.c.f.p.d. | Total Production in 20 Yrs., B.s.c.f. | Total Recovery, Percent |
|---|---|---|---|---|---|---|
| Unstimulated Cases: |  |  |  |  |  |  |
| One Conventional Well | 350 | 4 | 383 | 176 | 1.54 | 15.4 |
| Four Conventional Wells | 1,400 | 4 | 257 | 311 | 4.31 | 43.2 |
| Stimulated Cases: |  |  |  |  |  |  |
| "Probable" Well | 2,800 | 130 | 237 | 284 | 4.99 | 50.1 |
| "Minimum" Well | 1,000 | 275 | 286 | 299 | 3.81 | 38.2 |
| "Possible" Well | 2,800 | 245 | 217 | 290 | 5.53 | 55.5 |

NOTE.—Above data based on 640 acres, and 20 years total production time 9.96 billion std cu. ft. initial gas in place.

From the data set forth in Table V and the gas deliverability characteristics plotted in FIGURE 15, it is apparent that substantial increases in production and deliverability can be realized through the use of nuclear energy for increasing the permeability of a marginally producing formation and increasing the effective well bore radius. Deliverability evaluations can also be made for marginal oil reservoirs, using similar techniques. It is further apparent that given favorable (1) reservoir configurations, (2) device plus emplacement costs, and (3) operating costs, nuclear stimulation is an economically attractive proposition. Moreover, one of the favorable factors which has not been considered in the foregoing example is the large "well bore" storage capacity resulting from the nuclear explosion. If a nuclear stimulated gas field, for example, were located on a gas transmission line, this large storage capacity can serve as a balancing factor, and provide high productivity emergency capacity for the line in times of maximum demand.

It will have become apparent from the foregoing discussion that one difficulty which may be encountered in utilizing a single nuclear device in a horizontal bedded hydrocarbon formation is that a large portion of the energy developed may be effectively wasted in a vertical direction since the chimney and fractured zone above the point of the explosion frequently extends upwardly above the producing formation. In other words, the scaling of a single explosion to obtain a dynamic flow radius which is economically attractive may result in chimney formation and fracturing into the non-productive formation serving as cap rock to the hydrocarbon-bearing formation. It is therefore proposed by one embodiment of the present invention to improve the utilization of the total energy developed by nuclear explosions by using several relatively small devices positioned relative to the formation so that the superposition of the shock energy (waves) and uplift forces developed by the several devices act to provide increased fracturing (and thus dynamic flow characteristics) over that which can be accomplished when a single nuclear device of equivalent or much larger yield is employed. In other words, in a preferred embodiment of the invention, a plurality of devices are used to develop of larger well bore diameter and improved production characteristics as compared to a single larger device.

As an example of the manner in which increased permeable zone volume may be attained through the use of a plurality of nuclear devices, consider the example of a reservoir having the folowing properties:

Depth to top of hydrocarbon-bearing formation ft. 2300
Gross thickness of formation _____ ft. 400
Depth to base of formation _____ ft. 2700
Porosity _____ ft. 12.7
Bulk density _____ gm./cc. 2.38

The effect of using a single nuclear device, as well as multiple nuclear devices, can be calculated using the nuclear scaling laws and fluid dynamic equations for porous media. Assume that it is desired to create explosion generated chimneys of 400 feet to correspond to the thickness of the hydrocarbon-bearing formation. From the scaling equations hereinbefore set forth, a device of 12.5 kilotons will generate a 400-foot chimney and a permeable zone having a radius of 180 feet. Thus, the simultaneous detonation of two 12.5 kiloton devices placed a minimum of 360 feet apart would obviously provide two inter-connecting permeable zones. In actuality, placement of the devices at a greater horizontal distance from each other than the two radii of a single, shot-produced radius would also result in a continuous single enlarged permeable zone due to the superposition and interaction of the essentially spherical shock waves generated by the explosions. This interaction will result in a net reinforcement of the vertical uplift forces generated in the formation above and between the explosions.

Figure 16A:
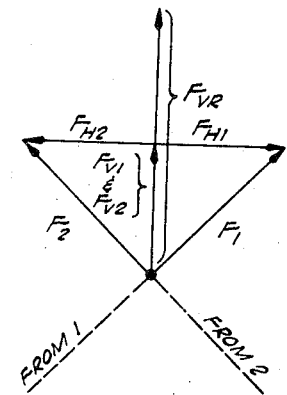
FIGURE 16A is an enlarged force vector diagram illustrating the interaction of forces produced by the two nuclear devices illustrated in FIGURE 16.

Reference to FIGURES 16 and 16A will aid in understanding the net effect of the use of a plurality of devices. Of course, FIGURES 16 and 16A represent the interaction of only two force components for each explosion, one vertical and one horizontal, whereas there are actually three force components, one vertical and two horizontal. Force interaction in the horizontal directions will have only minor significance in this application, however.

In FIGURE 16, two equal-sized 12.5-kiloton explosions located apart from each other by a distance of three radii of a single device-effected permeable zone are simultaneously detonated. $R_{C1}$ and $R_{C2}$ are initial blast created cavity radii calculated from the scaling laws. $R_{p1}$ and $R_{p2}$ are the radii of the permeability affected zones which would have occurred if each device had been detonated in the absence of the other. FIGURE 16A is an enlarged force diagram of the planar interaction between the forces produced by each device. $F_{V-1}$ and $F_{V-2}$ are the vertical force components of the two 12.5-kiloton explosions and $F_{H-1}$ and $F_{H-2}$ are the horizontal components of the explosions. In this example, at a point equidistant from each of the two explosion centers, the horizontal components, of course, will cancel. However, the vertical components will be additive, creating uplift and permeable zone formation where a single vertical component would be insufficient for uplift. In the general case, the horizontal components would not completely cancel, but in every case the vertical components would be additive for devices located at or below the base of the formation of interest.

Figure 17:
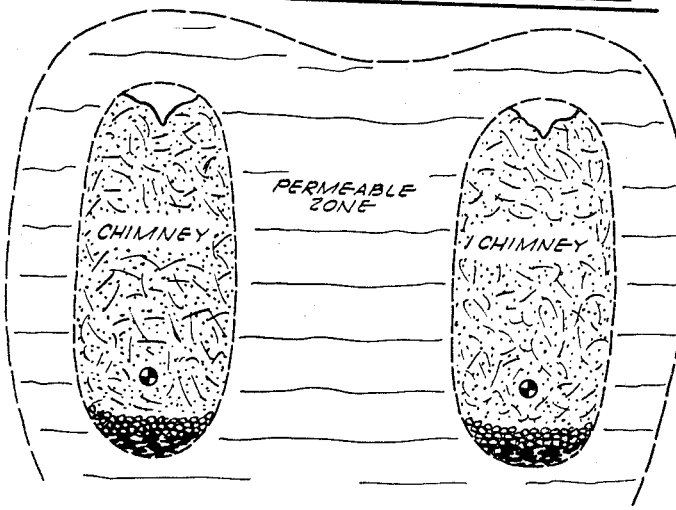
FIGURE 17 is a vertical cross-sectional diagram illustrating the actual cavity, chimney and permeable zones produced by detonation of two relatively small nuclear devices positioned as shown in FIGURE 16.
Figure 18:
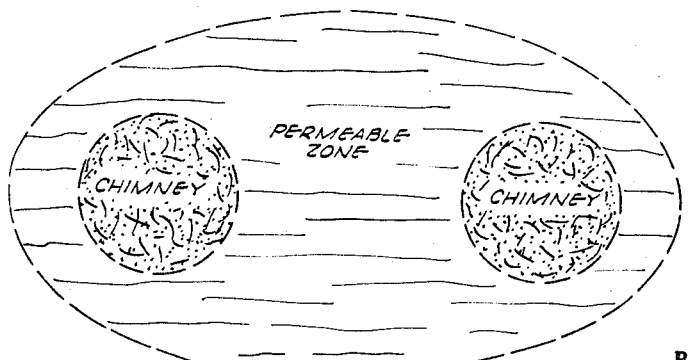
FIGURE 18 is a horizontal cross-sectional diagram of post-shot environment illustrated in FIGURE 17.

FIGURES 17 and 18 illustrate the resulting final interconnected permeable zones after the substantially simultaneous detonation of the two 12.5-kiloton nuclear devices positioned as illustrated in FIGURE 16.

By analogy to the known effects of simultaneously detonating horizontally spaced chemical explosives, the actual distance between nuclear devices which should be employed to yield an optimum effect insofar as maximum volume permeable zone creation is concerned should be between about 2.5 and 5 single explosion zone effective radii. Thus, the permeability affected radius for the dynamic fluid flow when the two nuclear devices are utilized will be between 405 and 630 feet, whereas a single 25-kiloton explosion would produce a permeable zone radius of only 230 feet. In addition, the 25-kiloton device would produce a chimney having a height of 505 feet, or extending 105 feet above the top of the producing horizon, thus wasting a considerable amount of the energy, and presenting the possibility of breaking into other undesirable geologic horizons or possibly even through the surface in the case of shallow reservoirs.

Although the foregoing discussion of one preferred embodiment of the invention has been directed to the example of using two devices which are substantially simultaneously detonated, similar or even more desirable effects can be obtained when other patterns or arrays of more than two devices are employed. The efficiency of triangular or other placement arrays will be even greater than in in the case of the use of two horizontally spaced devices.

From the foregoing description of the invention, it will be perceived that our investigations and research have led to the conclusion that the employment of nuclear energy provides a technically feasible and economically attractive procedure for increasing the productivity and deliverability of hydrocarbons from subterranean petroliferous formations which are of marginal or submarginal economic character relative to production by presently existing methods. We believe that the data hereinbefore described in considerable detail clearly evidence the great value and immediate advantages which can be ascribed to the proper use of nuclear explosives for the purpose of producing a large zone of increased permeability to improve the flow of hydrocarbons to a well bore of increased diameter. Although it may be that others have, from time to time during the period over which our investigations have extended, theorized that this usage of nuclear devices might ultimately prove to be an attractive proposition in some respects, we believe ourselves to be the first to clearly demonstrate the feasibility of this proposition, as well as the first to make a concrete and specific proposal for the manner in which nuclear devices must be used to effect the improved recovery of hydrocarbons from underground reservoirs.

Although certain specific embodiments of the invention have been described in considerable detail in order to provide a clear example of how the invention may be practiced to those who wish to exploit the invention, it is to be understood that certain variations and modifications in the prescribed procedures and techniques may be carried out without abandonment of the basic principles upon which the invention is founded. Insofar, therefore, as any changes and modifications in the specific procedures hereinbefore set forth do not entail a relinquishment of, or departure from, the basic principles upon which the invention is bottomed, such changes and innovations are deemed to be circumscribed by the spirit and scope of the invention except as the same may be necessarily limited by the appended claims or reasonable equivalents thereof.

What is claimed is:

1. A process for recovering gaseous hydrocarbons from a subterranean reservoir comprising:
   drilling a hole from the surface of the earth through the reservoir;
   measuring the distance from the surface of the earth through said hole to the deepest portion of said reservoir;
   identifying the depth of all subterranean aquifers lying above and below said reservoir;
   determining the maximum size of nuclear explosive which can bed etonated in said hole at a level below the uppermost portion of said formation without breaking through said aquifers and the surface of the earth;
   positioning said maximum size nuclear explosive in said hole at said level;
   sealing the hole;
   detonating said nuclear explosive;
   drilling a second hole into the immediate environment of said nuclear explosive; and
   producing gas from said reservoir via said second hole.

2. A process for recovering hydrocarbons from a subterranean formation comprising:
   substantially simultaneously detonating a plurality of nuclear explosives positioned adjacent the lower portion of said formation, said nuclear explosives being spaced horizontally from each other by a distance greater than the sum of the cavity radii of the two cavities which would be produced by each nuclear explosive when individually detonated; then
   drilling a hole into the zone of increased permeability created by the explosion of said devices to remove hydrocarbons from the explosion environment.

3. A process for recovering hydrocarbons from a subterranean formation comprising:
   substantially simultaneously detonating two nuclear explosives positioned adjacent to the lower portion of said formation, said nuclear explosives being spaced horizontally from each other by a distance greater than the sum of the cavity radii of the two cavities which would be produced by each nuclear explosive when individually detonated; then
   drilling a hole into the zone of increased permeability created by the explosion of said devices to remove hydrocarbons from the explosion environment.

4. A process as claimed in claim 3 wherein said explosives are of equal size and are horizontally spaced from each other by a distance of between 2.5 and 5 times the radius of the cavity which either explosion would produce if individually detonated.

5. A process as claimed in claim 4 wherein the yield of each of said nuclear explosives is about one-half the yield of the largest nuclear explosive which could be detonated between, and in the same horizontal plane as, said two explosives without breaking through the surface of the earth, and without breaking through any aquifers located above or below said subterranean formation.

(References on following page)

References Cited

UNITED STATES PATENTS

| | | | |
|---|---|---|---|
| 3,113,620 | 12/1963 | Hemminger | 166—36 |
| 3,233,670 | 2/1966 | Thompson et al. | 166—11 |

FOREIGN PATENTS 1,278,435  10/1961  France.

OTHER REFERENCES

Anon.: "Can Underground Blast Make Shale Oil Competitive?", Oil and Gas Journal, vol. 57, Jan. 12, 1959 (pp. 58–59) TN 860 039.

Atkinson et al.: "Atomic Age Fracturing May Soon Open Up Stubbon Reservoir," Oil and Gas Journal, vol. 61, Dec. 2, 1963 (pp. 154–156) TN 860 039.

Biehl et al.: "On the Possibility of Using Nuclear Detonations for Increasing the Field of Oil Wells," Plowshares Series Report No. 1, UCRL–5253, Sept. 8, 1958 (pp. 36–41).

Carlson.: "Constructing Underground Storage Facilities With Nuclear Explosions," The Petroleum Engineer, vol. 31, August 1959 (pp. B–32–34) TN 860 P4.

Coffer et al.: "Effects of Nuclear Explosions on Oil Reservoir Stimulation," Journal of Petroleum Technology, May, 1964 (pp. 473–480).

Johnson et al.: "Non-Military Uses of Nuclear Explosives," Scientific American, vol. 199, No. 6, December 1958 (pp. 29–35).

Sandia Corporation Technical Memorandum, SCTM 233–58 (51), "The Construction of Underground Oil Storage Tanks Utilizing Nuclear Explosives," April 1958 (pp. 5 to 7 and 13 to 22).

STEPHEN J. NOVOSAD, *Primary Examiner.*

UNITED STATES PATENT OFFICE
CERTIFICATE OF CORRECTION

Patent No. 3,409,082            November 5, 1968

Bruce G. Bray et al.

It is certified that error appears in the above identified patent and that said Letters Patent are hereby corrected as shown below:

Column 14, between lines 63 and 64, insert -- Gas deviation (compressibility) factor...   .94 --.

Signed and sealed this 17th day of March 1970.

(SEAL)
Attest:

Edward M. Fletcher, Jr.             WILLIAM E. SCHUYLER, JR.
Attesting Officer                     Commissioner of Patents